EPHRAIM BALL, Jr.

Wheel for Vehicles.

No. 119,811.          Patented Oct. 10, 1871.

Witnesses.

Inventor.

Ephraim Ball Jr.
per
Alexander & Mason
attys.

119,811

UNITED STATES PATENT OFFICE.

EPHRAIM BALL, JR., OF CANTON, OHIO.

IMPROVEMENT IN WHEELS FOR VEHICLES.

Specification forming part of Letters Patent No. 119,811, dated October 10, 1871; antedated October 7, 1871.

*To all whom it may concern:*

Be it known that I, EPHRAIM BALL, Jr., of Canton, in the county of Stark and in the State of Ohio, have invented certain new and useful Improvements in Wheels for Vehicles; and I do hereby declare that the following is a full, clear, and exact description thereof, reference being had to the accompanying drawing and to the letters of reference marked thereon making a part of this specification.

The nature of my invention consists in the construction and arrangement of a metallic wheel for vehicles, as will be more fully hereinafter set forth.

In order to enable others skilled in the art to which my invention appertains to make and use the same, I will now proceed to describe its construction and operation, referring to the annexed drawing, in which—

Figure 1:
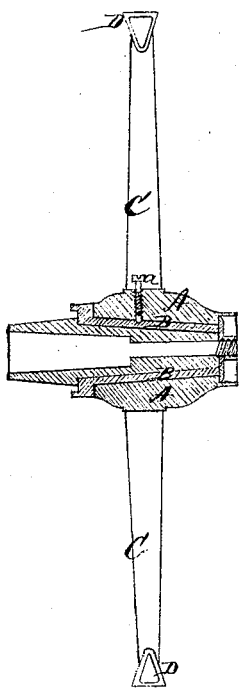
Figure 2:
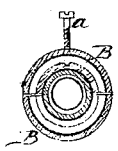
Figure 3:

Figure 1 is a vertical section of my metallic wheel. Fig. 2 is an end view of the hub, and Fig. 3 is a section of the felly.

A represents a metallic hub constructed in any of the known and usual ways. Inside of the metallic hub A I place a metallic bushing, B, which is secured in such a manner that it may be readily removed and replaced by another when worn out. Various methods may be resorted to for securing the bushing B in the hub; but I prefer to use a set-screw, a, to pass through the hub A and into a groove in the bushing. This set-screw may be easily loosened, when the bushing can be removed. The bushing B is made in two sections lengthwise so that they may be pressed or stamped by suitable dies or other devices into the desired shape. The inner end of the bushing B is provided with a double shoulder, $x y$, as shown in Fig. 1, the inner end of the hub bearing against the shoulder $x$, and the shoulder $y$ bearing against a corresponding shoulder on the axle. In the hub A are secured the spokes C C, the outer ends of which are provided with V-shaped notches, in which the hollow felly D is placed and suitably secured. This felly is made of metal bent in V-shape, as shown in Fig. 3, and the tire shrunk around the same, the angle of the felly fitting in the notches on the spokes, while the tire, so to say, covers the base of the felly. This makes a light and, at the same time, durable felly for wheels.

Having thus fully described my invention, what I claim as new, and desire to secure by Letters Patent, is—

1. The bisected bushing B provided at its inner end with a double shoulder, $x y$, in combination with the hub A and axle, constructed as shown, substantially as and for the purposes herein set forth.

2. The within-described wheel for vehicles, consisting of the hub A, bisected bushing B provided with shoulders, as described, spokes C, and V-shaped felly or fellies D having tire shrunk around the same, all substantially as set forth.

In testimony that I claim the foregoing I have hereunto set my hand this 27th day of December, 1870.

EPHRAIM BALL, JR.

Witnesses:
C. W. BALL,
A. J. CRISS.